United States Patent
Yi et al.

[19]

[11] Patent Number: 5,946,632
[45] Date of Patent: Aug. 31, 1999

[54] METHOD FOR UPDATING A RADIO AFFILIATION DATABASE

[75] Inventors: Steppen A. Yi, Lisle; Larry M. Peterson, West Dundee, both of Ill.

[73] Assignee: Motorola, Schaumburg, Ill.

[21] Appl. No.: 08/778,857

[22] Filed: Jan. 6, 1997

[51] Int. Cl.[6] .................................................. H04Q 7/28
[52] U.S. Cl. .............................................. 455/525; 455/520
[58] Field of Search ........................ 455/518, 519, 455/520, 509, 517, 432, 433, 524.5, 560, 561, 465; 370/338, 328, 340

[56] References Cited

U.S. PATENT DOCUMENTS

| | | | |
|---|---|---|---|
| 5,313,653 | 5/1994 | Sasuta | 455/509 X |
| 5,564,071 | 10/1996 | Liou et al. | 455/520 |
| 5,761,193 | 6/1998 | Derango et al. | 455/520 X |
| 5,761,618 | 6/1998 | Lynch et al. | 455/432 X |

*Primary Examiner*—Wellington Chin
*Assistant Examiner*—Philip J. Sobutka
*Attorney, Agent, or Firm*—Wayne J. Egan; Susan L. Lukasik

[57] ABSTRACT

A radio (101) affiliates with radio frequency sites (135, 145) based on a radio database (110) defining a group of valid site affiliations and a group of invalid site affiliations. Affiliations by the radio are controlled by a controller (120) with a controller database (160) defining a group of allowed site affiliations and a group of non-allowed site affiliations. When the controller database is altered, the radio database is updated to match the altered controller database. When the controller adds a site to its group of allowed site affiliations, it sends an updated radio database to the radio. When the controller adds a site to its group of non-allowed site affiliations, it waits until the radio requests permission to affiliate with that site and then sends an updated radio database to the radio. Upon receipt, the radio replaces its existing radio database with the updated radio database.

12 Claims, 4 Drawing Sheets

5,946,632

METHOD FOR UPDATING A RADIO AFFILIATION DATABASE

FIELD OF THE INVENTION

This application relates to radio frequency communication systems including, but not limited to, a method for updating a radio affiliation database.

BACKGROUND OF THE INVENTION

In current radio frequency ("RF") communication systems, a controller is provided with a database that contains, for each radio unit within the system, an entry defining which sites the radio unit is permitted to affiliate with. Also, individual radio units can be programmed with affiliation rights to multiple sites. Naturally, this arrangement leads to potential conflicts between the affiliation information programmed into the controller and the corresponding affiliation information programmed into the radio units themselves. As a result, it is possible for a unit to repeatedly attempt to affiliate with a site for which the radio unit itself is programmed, but with which site the controller has not been programmed to allow the radio unit to affiliate. For example, it is not unusual for the number of affiliation requests to exceed the number of affiliations allowed by a ratio of 8 to 1. These repeated affiliation attempts are a waste of system resources in the form of a tied-up control channel, as well as wasted battery current drain of the radio units. Also, repeated failed affiliation attempts are an annoyance to system users.

The current approach for solving this problem is for the radio unit user or system manager to notice the repeated affiliation attempts and recognize that there is a programming conflict between the radio and the controller. In this case, the unit must then be physically brought to a central location for reprogramming. This solution is inadequate because the user or the system manager may not immediately recognize the problem, and also the unit must be temporarily taken out of service.

Thus, there is a need for an improved method for updating a radio affiliation database.

DESCRIPTION OF THE PREFERRED EMBODIMENT

Briefly, a radio affiliates with RF sites based on a radio database defining a group of valid site affiliations and a group of invalid site affiliations. Affiliations by the radio are controlled by a controller with a controller database defining a group of allowed site affiliations and a group of non-allowed site affiliations. When the controller database is altered, the radio database is updated to match the altered controller database. When the controller adds a site to its group of allowed site affiliations, it sends an updated radio database to the radio. When the controller adds a site to its group of non-allowed site affiliations, it waits until the radio requests permission to affiliate with that site and then sends an updated radio database to the radio. Upon receipt, the radio replaces its existing radio database with the updated radio database.

Figure 1:
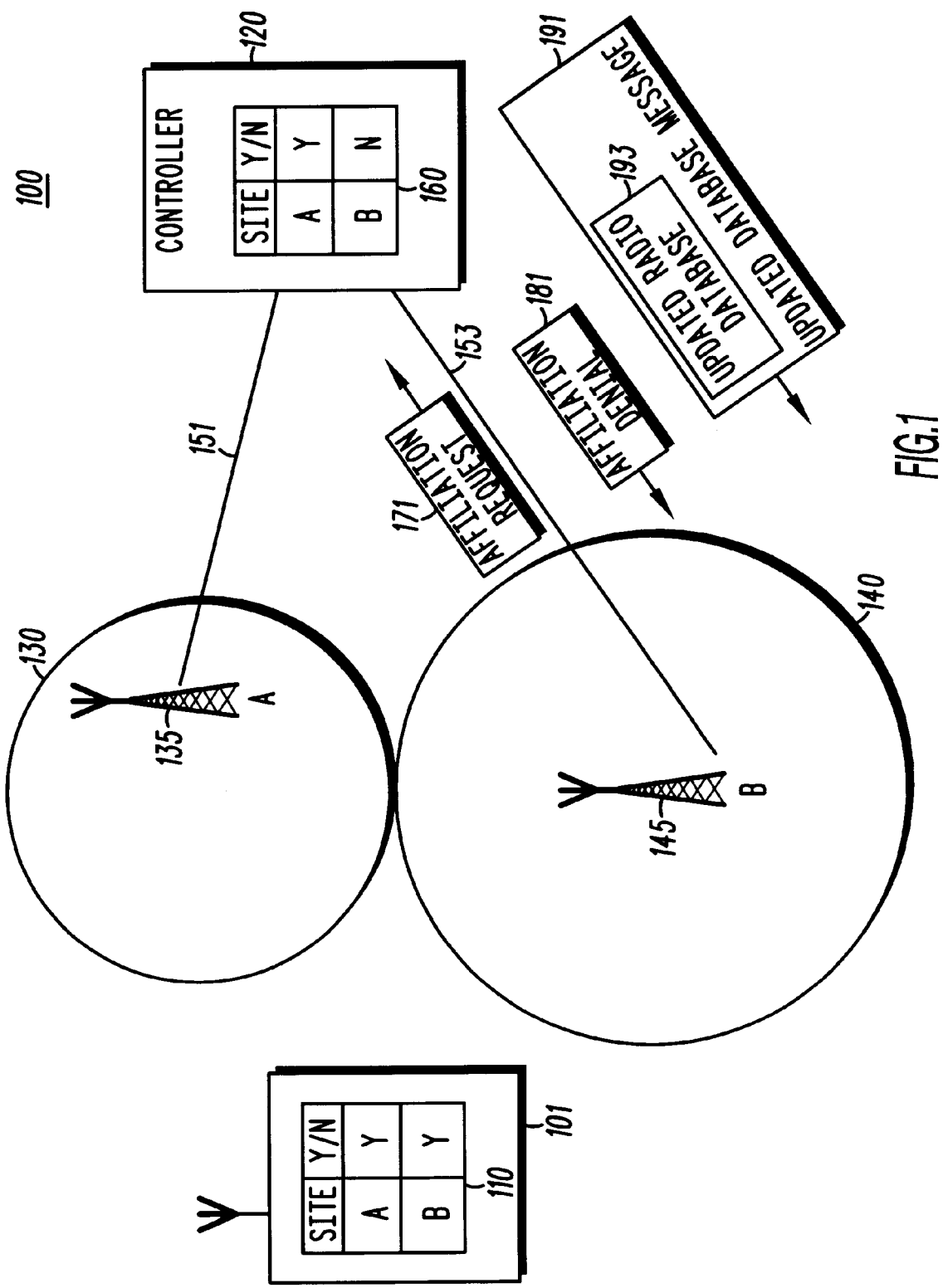
FIG. 1 depicts a radio frequency communication system 100 suitable for demonstrating a method for updating a radio affiliation database, in accordance with the present invention.

Referring now to FIG. 1, there is depicted a radio frequency communication system 100 suitable for demonstrating a method for updating a radio affiliation database, in accordance with the present invention. There is shown a radio frequency communication system 100 including a controller 120, a radio 101 and a plurality of sites A (reference number 135) and B (reference number 145), each site of the plurality of sites being coupled to the controller by links 151, 153. There is also shown the coverage area 130 for site A and the coverage area 140 for site B.

As shown, the radio 101 includes a radio database 110 defining a valid site group and an invalid site group, the valid site group comprising those sites of the plurality of sites with which affiliations are valid for the radio, and the invalid site group comprising those sites of the plurality of sites with which affiliations are invalid for the radio. The radio database 110 shows that affiliation by the radio 101 with site A is valid, as depicted by the symbol "Y" (for "yes") adjacent to the site symbol "A". Likewise, the radio database 110 shows that affiliation by the radio 101 with site B is valid, as depicted by the symbol "Y" (for "yes") adjacent to the site symbol "B". Thus, the radio database 110 presently defines a valid site group comprising sites A and B, and an invalid site group presently comprising no (zero) sites.

The radio is further arranged for affiliating with one or more sites of the plurality of sites based on the radio database.

As shown, the controller 120 includes a controller database 160 defining a controller allowed site group and a controller non-allowed site group, the controller allowed site group comprising those sites of the plurality of sites with which affiliations are allowed for the radio, and the controller non-allowed site group comprising those sites of the plurality of sites with which affiliations are not allowed for the radio. The controller database 160 shows that affiliation by the radio 101 with site A is allowed, as depicted by the symbol "Y" (for "yes") adjacent to the site symbol "A". However, the controller database 160 shows that affiliation by the radio 101 with site B is non-allowed, as depicted by the symbol "N" (for "no") adjacent to the site symbol "B". Thus, the controller database 160 presently defines a controller allowed site group comprising the site A, and a controller non-allowed site group presently comprising the site B.

Figure 2:
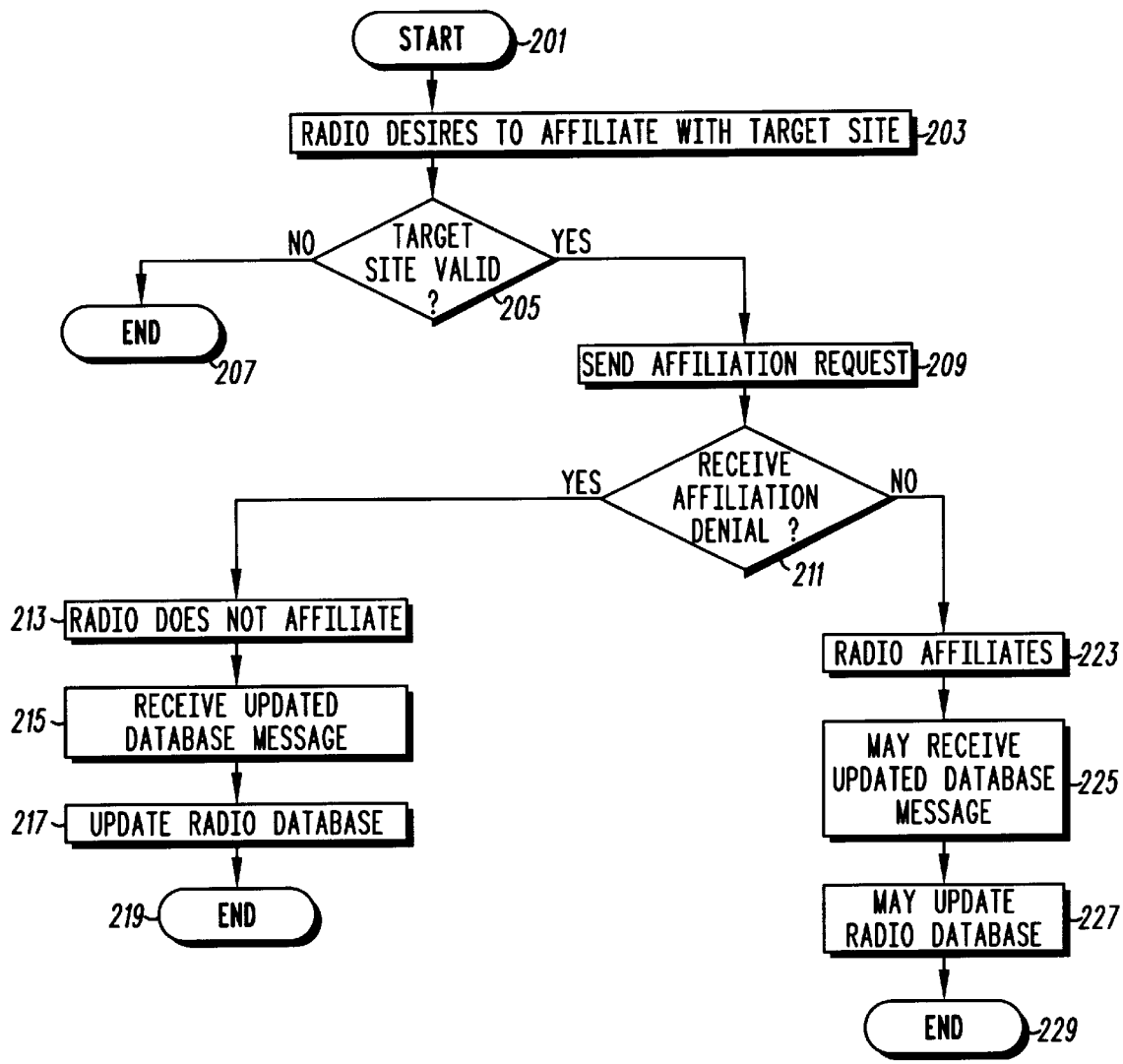
FIGS. 2–4 are flow diagrams for a method for updating a radio affiliation database, in accordance with the present invention.

Referring to FIG. 2, there is shown a flow diagram for the radio 101 to affiliate with a target site and to update the radio database.

The process starts (step 201) and, when the radio desires to affiliate with a target site (step 203), the process goes to step 205.

In step 205, the radio determines whether the target site is a member of the valid site group. If the determination from this step 205 is negative (the target site is not a member of the valid site group), the process ends (step 207). Otherwise, if the determination from this step 205 is positive (the target site is a member of the valid site group), the process goes to step 209.

In step 209, when the target site is a member of the valid site group, the radio sends an affiliation request message to the controller 120, the affiliation request message requesting permission for the radio to affiliate with the target site. (The affiliation request message is depicted in FIG. 1 as element 171.)

In step 211, the radio determines when an affiliation denial message is received from the controller, the affiliation denial message denying permission for the radio to affiliate with the target site. (The affiliation denial message is depicted in FIG. 1 as element 181.)

When the affiliation denial message is received from the controller, then the determination from step 211 will be positive, and the process goes to step 213, where the radio does not affiliate with the target site.

In step 215, the radio receives an updated database message (depicted as element 191 in FIG. 1) from the controller, the updated database message including an updated radio database (depicted as element 193 in FIG. 1).

Upon receipt of the updated database message 191 containing the updated radio database 193, in step 217 the radio updates the radio database 110 based on the updated database message, including a step of replacing the radio database with the updated radio database 193. If this step 217 results in adding one or more sites to the valid site group, the updated radio database is deemed to be "upgraded." Otherwise, if this step 217 results in adding one or more sites to the invalid site group, the updated radio database is deemed to be "downgraded."

The process then ends, step 219.

Returning to step 211, when the affiliation denial message is not received from the controller, then the determination from step 211 will be negative, and the process goes to step 223, where the radio affiliates with the target site.

As will be explained in more detail below, in step 225, upon affiliating with the target site, the radio optionally may receive an updated database message from the controller, the updated database message including an updated radio database. In this event, in step 227, the radio updates the radio database based on the updated database message. The process then ends, step 229.

Figure 3:
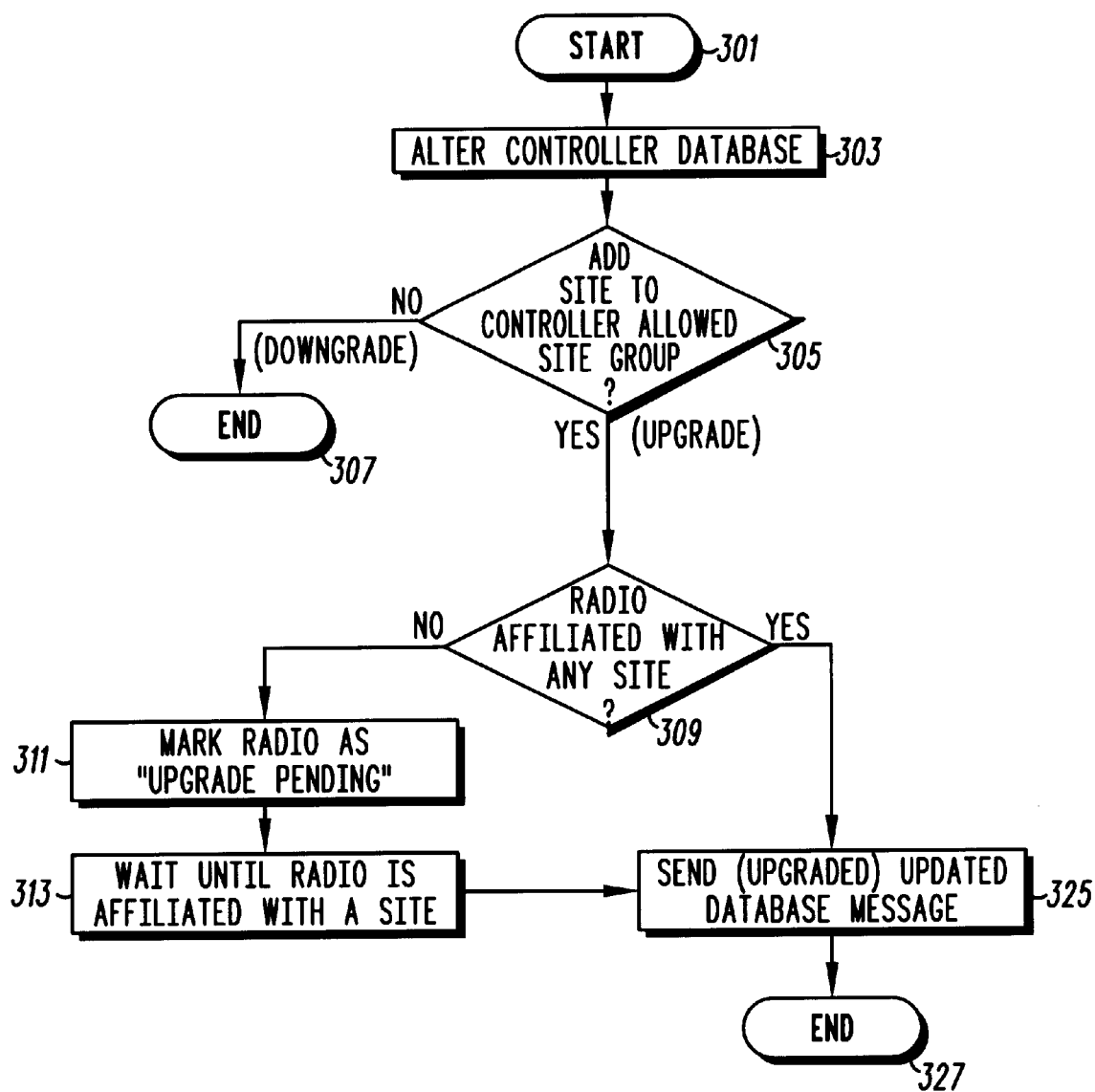
Figure 4:
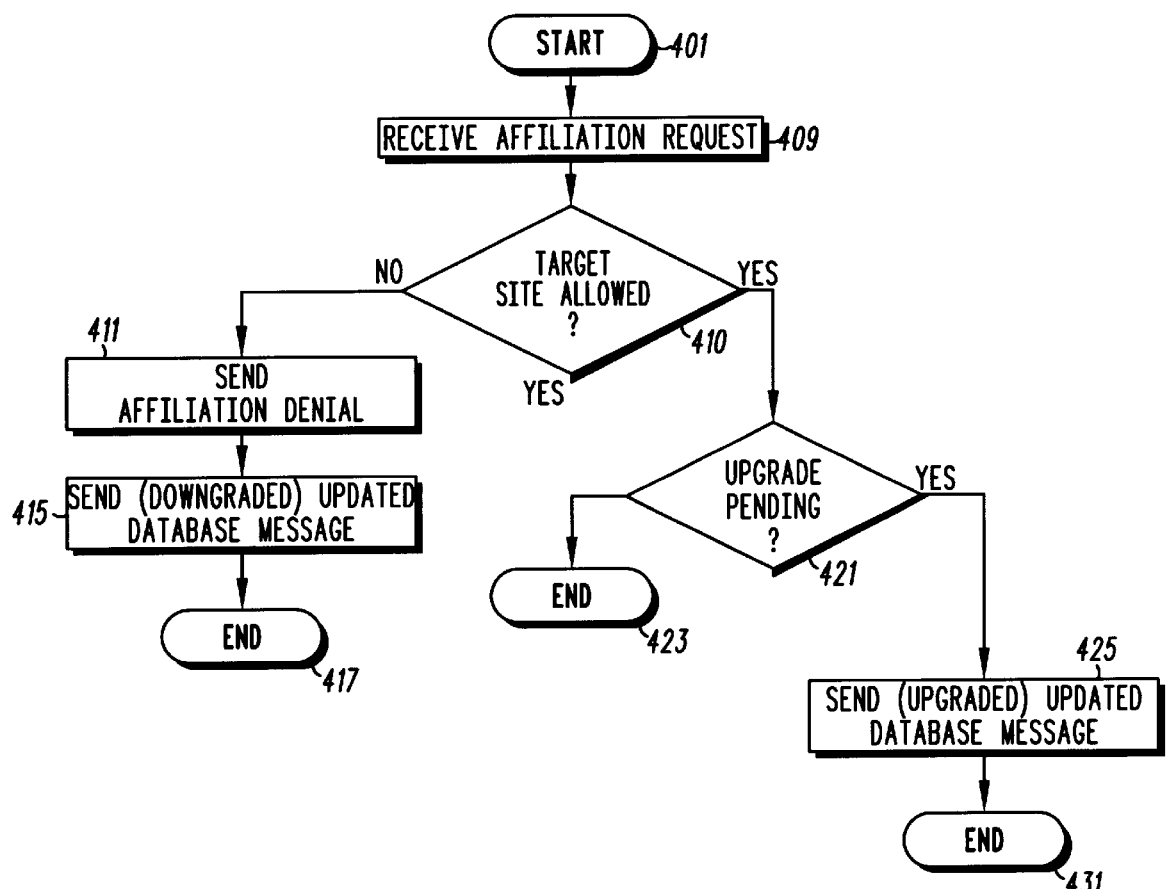

Referring to FIGS. 3–4, there are shown two (2) flow diagrams for the controller 120.

FIG. 3 depicts a flow diagram for the controller to update the radio database in response to altering the controller database. The process starts (step 301), and then goes to step 303.

In step 303, the controller alters the controller database by adding at least one site to the controller allowed site group or to the controller non-allowed site group.

In step 305, the controller 120 determines whether the altering step 303 has resulted in adding at least one site of the plurality of sites to the controller allowed site group.

If at least one site of the plurality of sites has not been added to the controller allowed site group, then the results of this determining step 305 will be negative. As a result, the altered controller database 160 is deemed to be "downgraded," and the process ends, step 307.

Otherwise, if step 303 results in at least one site of the plurality of sites being added to the controller allowed site group, then the results of this determining step 305 will be positive. As a result, the altered controller database 160 is deemed to be "upgraded," and the process goes to step 309.

In step 309, the process determines whether the radio is currently affiliated with at least one site of the plurality of sites.

When the radio is not currently affiliated with at least one site of the plurality of sites, then the results of this determining step 309 will be negative, and the process goes to step 311.

In step 311, the controller 120 marks the status of the radio 101 as "upgrade pending." The process then goes to step 313.

In step 313, the controller waits until the radio is currently affiliated with at least one site of the plurality of sites, and then goes to step 325, which step is discussed below.

Returning to step 309, when the radio is currently affiliated with at least one site of the plurality of sites, then the results of this determining step 309 will be positive, and the process goes to step 325.

In step 325, the controller sends an updated database message 191 to the radio, the updated database message being based on the controller database 160. Since the controller database is deemed to be "upgraded," the updated database message is likewise deemed to be "upgraded," as depicted in step 325 of FIG. 3.

With momentary reference to the above discussion of steps 215 and 217, it will be understood that the updated database message 191 sent by the controller 120 includes an updated radio database 193, where the updated radio database is based on the controller database 160. Moreover, it will be further understood that, upon receipt of the updated database message 191 containing the updated radio database 193, the radio 101 updates the radio database 110 based on the updated database message by replacing the radio database with the updated radio database 193.

The process then ends, step 327.

FIG. 4 depicts a flow diagram for the controller to update the radio database in response to receiving an affiliation request message from the radio. The process starts (step 401), and then goes to step 409.

In step 409, the controller receives an affiliation request message from the radio, the affiliation request message indicating that the radio desires to affiliate with a target site.

In step 410, the process determines whether the target site is a member of the controller allowed site group. When the target site is a member of the controller non-allowed site group, then the determination of this step 410 will be negative, and the process goes to step 411.

In step 411, the controller sends an affiliation denial message to the radio, the affiliation denial message denying permission for the radio to affiliate with the target site.

In step 415, the controller sends an updated database message to the radio.

With momentary reference to the above discussion of steps 215 and 217, it will be understood that the updated database message 191 sent by the controller 120 includes an updated radio database 193, where the updated radio database is based on the controller database 160. Moreover, it will be further understood that, upon receipt of the updated database message 191 containing the updated radio database 193, the radio 101 updates the radio database 110 based on the updated database message by replacing the radio database with the updated radio database 193.

Returning to FIG. 4, the process then ends, step 417.

It will be appreciated that the request to affiliate with the target site indicates the target site is currently a member of the radio 101's valid site group. In contrast, the controller's affiliation denial indicates the target site is currently a member of the controller non-allowed site group. Updating the radio database effectively results in replacing the radio database with the controller database. Accordingly, the radio database updating step will include a step of adding one or more sites—including the target site—to the invalid site group of the radio. As a result, the updated database message is depicted as "downgraded" in step 415 of FIG. 4.

The process then ends, step 417.

Returning to step 410, when the target site is a member of the controller allowed site group, then the determination will be positive, and the process goes to step 421.

In step 421, the controller 120 determines whether it has marked the status of the radio 101 as "upgrade pending" as described in the above step 311.

If the controller has not marked the status of the radio 101 as "upgrade pending" in step 311 above, then the results of this determination step 421 will be negative, and the process ends, step 423.

In contrast, if the controller has marked the status of the radio 101 as "upgrade pending" in step 311 above, then the results of this determination step 421 will be positive, and the process goes to step 425.

In step 425, the controller sends an updated database message to the radio. Referring back momentarily to FIG. 3, step 305 has previously determined that at least one site has been added to the controller allowed site group. Since the radio database updating step effectively replaces the radio database with the controller database, then the radio database updating step will include a step of adding one or more sites to the valid site group of the radio. As a result, the updated database message is depicted as "upgraded" in step 425 of FIG. 4.

The process then ends, step 431.

Some advantages of a method for updating a radio affiliation database, in accordance with the present invention, are discussed below.

The present invention improves system performance by eliminating conflicts between the controller affiliation database and the radio affiliation database, thereby preventing repeated affiliation attempts by radio units. Thus, no longer will a radio repeatedly attempt to affiliate with a site with which the radio is currently not allowed to affiliate by the controller. Elimination of repeated affiliation attempts also prevents the waste of system resources in the form of a tied-up control channel and wasted battery drain of the radio units. Since repeated failed affiliation attempts are removed, the corresponding annoyance to system users has also been eliminated. Thus, since a radio unit will now only affiliate with valid sites, henceforth a user will not be annoyed by invalid or busy tones while the radio searches for a valid site. As a result, system users are more satisfied with the system's operation.

Moreover, with the present invention, there is no longer a necessity for the radio unit user or system manager to notice the repeated affiliation attempts and recognize that there is a programming conflict between the radio and the controller. Further, there is no longer a requirement for the unit to be physically brought to a central location for reprogramming. As a results, the units no longer need to be taken out of service for reprogramming, thus resulting in increased savings of time and resources for the system users.

Further, with the present invention, the initial programming of all radio units is greatly simplified because each radio unit may be initially programmed with the identical radio database.

Moreover, while it is currently possible to "over-the-air" download a code plug containing the full operational characteristics for a radio unit, this approach typically requires a dedicated RF channel for transferring programmed data over a significant period of time. This approach also requires the target radio unit to recycle its power in order to refresh to the new code plug. As a result, the radio unit is temporarily out of service, which could be dangerous if the radio user is in an emergency situation.

In contrast, the present invention allows the radio database to be transmitted via the control channel using only a few outbound signaling words. Also with the present invention, the radio unit is not taken out of service at all, thus enhancing the radio's capability, without reducing its operability.

While various embodiments of a method for updating a radio affiliation database, in accordance with the present invention, have been described hereinabove, the scope of the invention is defined by the following claims.

We claim:

1. In a radio frequency communication system including a controller, a radio and a plurality of sites, each site of the plurality of sites being coupled to the controller, the radio including a radio database defining a valid site group and an invalid site group, the valid site group comprising those sites of the plurality of sites with which affiliations are valid for the radio, the invalid site group comprising those sites with which affiliations are invalid for the radio, the radio being arranged for affiliating with one or more sites of the plurality of sites based on the radio database, a method for the radio to affiliate with a target site and to update the radio database, the method including the steps of:

by the radio:
(a) desiring to affiliate with a target site;
(b) determining when the target site is a member of the valid site group;
(c) when the target site is a member of the valid site group, sending an affiliation request message to the controller, the affiliation request message requesting permission for the radio to affiliate with the target site;
(d) determining when an affiliation denial message is received from the controller, the affiliation denial message denying permission for the radio to affiliate with the target site;
(e) when the affiliation denial message is received from the controller, not affiliating with the target site;
(f) receiving an updated database message from the controller; and,
(g) updating the radio database based on the updated database message.

2. The method of claim 1, where the updated database message includes an updated radio database.

3. The method of claim 2, where the updating step (g) includes a step of replacing the radio database with the updated radio database.

4. In a radio frequency communication system including a controller, a radio and a plurality of sites, each site of the plurality of sites being coupled to the controller, the radio including a radio database defining a valid site group and an invalid site group, the valid site group comprising those sites of the plurality of sites with which affiliations are valid for the radio, the invalid site group comprising those sites of the plurality of sites with which affiliations are invalid for the radio, the radio being arranged for affiliating with one or more sites of the plurality of sites based on the radio database, the controller including a controller database defining a controller allowed site group and a controller non-allowed site group, the controller allowed site group comprising those sites of the plurality of sites with which affiliations are allowed for the radio, the controller non-allowed site group comprising those sites of the plurality of sites with which affiliations are not allowed for the radio, a method for the controller to update the radio database, the method including the steps of:

by the controller:
(a) altering the controller database, including a step of adding at least one site of the plurality of sites to the controller allowed site group;

(b) when the radio is currently affiliated with at least one site of the plurality of sites, sending an updated database message to the radio, the updated database message being based on the controller database; and, by the radio:

(c) updating the radio database based on the updated database message.

5. The method of claim 4, including the step of, by the controller:

(b1) when the radio is not currently affiliated with at least one site of the plurality of sites, waiting until the radio is currently affiliated with at least one site of the plurality of sites, and then sending an updated database message to the radio, the updated database message being based on the controller database.

6. The method of claim 5, where the updated database message includes an updated radio database.

7. The method of claim 6, where the updating step (c) includes a step of replacing the radio database with the updated radio database.

8. In a radio frequency communication system including a controller, a radio and a plurality of sites, each site of the plurality of sites being coupled to the controller, the radio including a radio database defining a valid site group and an invalid site group, the valid site group comprising those sites of the plurality of sites with which affiliations are valid for the radio, the invalid site group comprising those sites of the plurality of sites with which affiliations are invalid for the radio, the radio being arranged for affiliating with one or more sites of the plurality of sites based on the radio database, the controller including a controller database defining a controller allowed site group and a controller non-allowed site group, the controller allowed site group comprising those sites of the plurality of sites with which affiliations are allowed for the radio, the controller non-allowed site group comprising those sites of the plurality of sites with which affiliations are not allowed for the radio, a method for the controller to update the radio database, the method including the steps of:

by the controller:

(a) receiving an affiliation request message from the radio, the affiliation request message indicating that the radio desires to affiliate with a target site;

(b) determining when the target site is a member of the controller non-allowed site group;

(c) when the target site is a member of the controller non-allowed site group, sending an updated database message to the radio; and, by the radio:

(d) updating the radio database based on the updated database message.

9. The method of claim 8, where the sending step (c) includes a step of sending an affiliation denial message to the radio, the affiliation denial message denying permission for the radio to affiliate with the target site.

10. The method of claim 8, where the updated database message includes an updated radio database.

11. The method of claim 10, where the updated radio database is based on the controller database.

12. The method of claim 10, where the updating step (d) includes a step of replacing the radio database with the updated radio database.

* * * * *